United States Patent
Tormasov et al.

(10) Patent No.: US 7,958,097 B1
(45) Date of Patent: *Jun. 7, 2011

(54) METHOD AND SYSTEM FOR IMPLEMENTATION OF DATA STORAGE QUOTA

(75) Inventors: Alexander G. Tormasov, Moscow (RU); Stanislav S. Protassov, Moscow (RU); Serguei M. Beloussov, Singapore (SG)

(73) Assignee: Parallels Holdings, Ltd. (BM)

( * ) Notice: Subject to any disclaimer, the term of this patent is extended or adjusted under 35 U.S.C. 154(b) by 535 days.

This patent is subject to a terminal disclaimer.

(21) Appl. No.: 12/021,162

(22) Filed: Jan. 28, 2008

Related U.S. Application Data

(63) Continuation-in-part of application No. 10/670,093, filed on Sep. 24, 2003, now Pat. No. 7,325,017.

(51) Int. Cl.
  *G06F 17/30* (2006.01)
  *G06F 9/50* (2006.01)
  *G06F 7/00* (2006.01)
(52) U.S. Cl. ................... 707/694; 707/781; 707/831
(58) Field of Classification Search .............. None
  See application file for complete search history.

(56) References Cited

U.S. PATENT DOCUMENTS

| | | | | |
|---|---|---|---|---|
| 5,713,013 | A * | 1/1998 | Black | 1/1 |
| 5,905,990 | A * | 5/1999 | Inglett | 1/1 |
| 5,940,841 | A | 8/1999 | Schmuck et al. | |
| 6,092,163 | A | 7/2000 | Kyler et al. | |
| 6,560,613 | B1 | 5/2003 | Gylfason et al. | |
| 6,618,736 | B1 | 9/2003 | Menage | |
| 6,832,248 | B1 * | 12/2004 | Byrnes | 709/223 |
| 2002/0023156 | A1 * | 2/2002 | Chujo et al. | 709/226 |
| 2003/0009484 | A1 * | 1/2003 | Hamanaka et al. | 707/200 |
| 2005/0050107 | A1 * | 3/2005 | Mane et al. | 707/200 |
| 2006/0069665 | A1 * | 3/2006 | Yamakawa et al. | 707/1 |

\* cited by examiner

*Primary Examiner* — Jay A Morrison
*Assistant Examiner* — Sangwoo Ahn
(74) *Attorney, Agent, or Firm* — Bardmesser Law Group

(57) ABSTRACT

The present invention provides a methodology of organization of control over the process of space or other quantitative parameter of resource allocation in computer data storages. More specifically, the present invention organizes areas of quoted space or time. A method and system of the present invention includes an establishment of quotas for an area of a file system that takes into account the belonging of a file to a certain subtree or subtrees of the file system. The quota management of the present invention is established within a usual computer system which includes a hierarchic file system, as well as a set of unique users, that could be united into groups.

22 Claims, 6 Drawing Sheets

Process of alteration of space size occupied by the file taking into account a quota on the reserved resources Computer file system before mounting of the subtree;
directory "/usr/bin" is empty Computer file system after mounting of the subtree to directory "/usr/bin"

Process of alteration of space size occupied by the file taking into account a quota on the reserved resources

METHOD AND SYSTEM FOR IMPLEMENTATION OF DATA STORAGE QUOTA

CROSS-REFERENCE TO RELATED APPLICATIONS

This application is a continuation of U.S. Provisional patent application Ser. No. 10/670,093, filed on Sep. 24, 2003, entitled METHOD OF IMPLEMENTATION OF DATA STORAGE QUOTA, which is incorporated by reference herein in its entirety.

BACKGROUND OF THE INVENTION

1. Field of the Invention

The present invention relates to computer data storage. More particularly, the present invention relates to organizing and controlling quoted space or time in computer data storage.

2. Description of Related Art

A computer file system is used to control and organize the process of computer data storage. It can be implemented as part of a computer operating system intended to provide users with a handy interface when working with data (e.g., files) stored on a computer storage device and to provide mutual use of data by several users and processes.

More specifically, a computer file system includes files stored on a computer storage device (e.g., a disk) and a set of data structures used to control the files, such as file directories, file descriptors, distribution tables for free and occupied space on the storage device, etc. In operation, a file system may perform a plurality of tasks, such as accessing files stored on the computer storage device, providing data cashing, fault tolerance, etc.

The task to provide quota on a computer storage device (i.e., disk quota management) appeared as a result of a multi-user mode of computer usage. An example of such computer usage is provided in *The Design and Implementation of the 4.4BSD Operating System* (*Unix and Open Systems Series*) by Marshall Kirk McKusick (Editor), Keith Bostic and Michael J. Karels (Editor), Addison-Wesley Pub Co; ISBN: 0201549794, p 253-256.

Quota management can be used to restrict the use of operating system resources and can be based on different criteria, such as belonging to a user or directory. Specifically, disk quota management limits availability of disk resources for file system users. Without disk quota management, users can utilize as much disk space as they want. Such utilization may adversely affect system efficiency because other users, as well as the operating system itself, may not access sufficient disk space. A system having disk quota management limits the maximum disk space available to users and guarantees there will be always enough disk space for system operations. Therefore, fault tolerance of the system is increased in a system having disk quota management.

Although systems providing disk quota management are embedded into many operating systems (OSes), some OSes do not have disk quotas or they are not safely implemented. For example, old versions of Microsoft Windows NT (including version 4.0 and prior) did not have disk quota management systems.

In OSes that do have disk quota management systems, there are two main quota types—user quotas and directory quotas. User quotas are based on user criteria; that is, each user has a limit of disk space, file number, etc. Directory quotas are based on directory criteria; that is, each directory has a limit of disk space, file number, etc. In some conventional file systems directory quotas are called tree quotas. Tree quotas limit the number and size of files in the sub-tree of the file system for all users without separating them.

Quotas can be described as either hard quotas or soft quotas. A hard quota cannot be exceeded. As the user achieves the limits of the hard quota, the resources of the corresponding file system are no longer allocated to that user. For example, if the user has a hard quota of 500 blocks in the file system and currently is using 490 blocks, then the user can obtain only ten (10) additional blocks. Any attempt to access eleven (11) or more blocks will fail.

A soft quota can be exceeded during some period of time. This period is also called a delay or grace period (e.g. a week). If the user exceeds her soft quota in excess of the grace period, then the soft quota becomes a hard quota and further allocation of resources will be banned. When the user returns to the level below the soft quota, the delay period is reset.

Mechanisms for quota calculation or recalculation have various implementations. In some operating systems, a quota to user files is recalculated during authorization of the user. Such an approach however, results in serious time delays. Other implementations provide quota recalculation at some moment in time. During a time period between recalculation, users can seriously exceed the allowed quota. Accordingly, the most up-to-date implementation recalculates a quota during particular operations with a file. The recalculation can be done when an operation is performed by intercepting the operation at the level of the file system driver. Analysis of user's permissibility also can be done subsequent to performing the operation. However, in the latter case the user can considerably exceed her quota by saving a large file.

There are two other methods to accomplish quota recalculation. The first method is when an operating system reviews all its files, finds the files owned by the user, calculates the size of the user's files, and decides on permissibility of the user's further file operations. This method leads to long recalculating delays and should not be implemented for quota analysis on each user's file operations. The preferred (or more effective) method for quota recalculation is when an operating system (or any other service) maintains records in a quota database. In this implementation, current quotas and the space occupied by each user are stored in the database. It is thus necessary to track each file operation affecting the space size and, correspondingly, modify values in the database.

Therefore, according to the foregoing, quota methods, when properly implemented, can provide obvious advantages to computer file systems, such as increasing system failure tolerance. But, technical implementation of quotas brings some problems. Among the potential problems are when and how is it necessary to determine who among a plurality of users owns a file. Based on that determination, how should the user's quota for that file be checked. More specifically, for example, a file can be both a logical and physical notion. Physically, a file can take less space than logically; that is, it can be compressed by file system tools. Thus, as the system has physical disk space constraints, a question arises as to what size or quantitative parameter of resource should be taken into account when a quota is defined. Similarly, one file may have several representations under different names, in different directories, and so on. Physically, a file takes only one space. Therefore, for correct (or proper) implementation of quotas, it is necessary to take into account various nuances of logical and physical implementation of the file systems.

Accordingly, it would be desirable to provide a method and system for the implementation of data storage quotas (e.g., disk quotas) that overcomes the above-described technical problems. More particularly, it is desirable to provide a method and system of implementation of data storage quotas that pays special attention to the issues of mounting file systems and user accounts. Furthermore, it is desirable to provide a method and system that allows for a single partition of a file system (e.g., a mount point) with a plurality of quotable areas having a separate (i.e., having their own) set of quota limitations.

SUMMARY OF THE INVENTION

The present invention provides a method and system of management of the process of disk space, or other quantitative parameter of resource allocation in computer data storages, particularly concerning areas of quotable space or time. The method and system of the present invention includes an establishment of quotas for an area of a file system that takes into account the belonging of a file to a certain subtree, or subtrees, of the file system. The quota management of the present invention is established within a computer system having a hierarchic file system, as well as a set of unique users that can be united into groups. Accordingly, an advantage of the present invention is that a single partition of a file system (e.g., a mount point) can have a plurality of quotable areas with a separate (i.e., their own) set of quota limitations.

In an embodiment of the present invention, a method and system of implementation of a data storage procedure is provided. The method and system includes a computer system, a user group, a hierarchic computer file system, a mounting procedure and a system for calculating a used quantitative parameter of file resource consumption (e.g., used space, used time-related parameters, etc.). The computer system includes authorized users who can obtain unique identifiers within any context of the operating system of the computer system. The user group is comprised of users, as mentioned above, who have their own unique identifiers within any context of the operating system. The above mentioned users can participate in any number of user groups or alone. The hierarchic computer file system is organized on top of one or several data storage devices of the computer system, where a plurality of files are arranged into trees and where each file has an identifier, as mentioned above, which denotes whether the file belong to a single user or a user group. That is, a file or a set of files (e.g., a set of files in a directory) can be owned by a single user or a user group.

A plurality of parameters of the above-mentioned computer file system are used to describe qualitative characteristics regarding the consumption level of file system resources for these users and the user group. The mounting procedure engages a specific data storage area as a second file system inside any available directory of the hierarchic computer file system. After executing the mounting procedure, the above mentioned computer system may utilize the second file system as an extension of a new tree of the hierarchic computer system. A set of directories in the hierarchic computer system provides the mounting points for the second file system. The mounting points are located inside the hierarchic computer file system. File system volumes and file system sub-trees both can be used as mounting objects of the mounting points.

The used quantitative parameter of file resource consumption is associated with the above mentioned files. For each user, it can provide the total value of a set of quantitative parameters of file resource consumption (e.g., a total size of files). The set of quantitative parameters of file resource consumption are marked by the above-mentioned, unique identifiers that have been coupled to the used resource quantitative parameter of file resource consumption, as well as by other quota parameters of the used quantitative parameter of file resource consumption. In addition, one of the above-mentioned users can have the same unique identifier in different file system trees, maintaining different quotas. Accordingly, in a more specific embodiment of the present invention, quota limits include only the quantitative parameters of file resource consumption (or consumption parameters) effective inside a particular tree.

A more complete understanding of the present invention will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

In the following description, numerous specific details are set forth to provide a more thorough description of embodiments of the invention. To one skilled in the art, however, it is apparent that the invention may be practiced without these specific details. Well-known features have not been described in detail so as not to obscure the invention.

File System Mounting

Embodiments of the present invention can be implemented within a computing system having several disk devices. For example, a computing system can include a hard disk device (HDD), a floppy disk device, and a CD drive device. Powerful computers as a rule have several disk storages with installed Redundant Array of Independent (or Inexpensive) Disks (RAIDs). Moreover, even one physical device may be represented as several logical disk devices using operating system tools, particularly, by dividing disk space into partitions. Accordingly, an embodiment of the present invention provides a method and apparatus for determining how to store files in the computing system that has several external memory devices.

Particularly, a first solution for determining how to store files in the system is to include each disk device with an autonomous file system. That is, files contained on this device, are described by a directory tree, which is not associated with directory trees on other devices. In this case, for unique file identification, users must specify the logical device identifier (e.g., A) together with the composite symbolic file name. The MS-DOS operating system is an example of such an autonomous file system, where the full file name path includes a letter identifier of the logical disk (e.g., A). Thus, at each access to a file, located on disk A, a user must specify this disk name: A:\privat\letter\uno\let1.doc.

Another variant to the above described solution is to store files so that a user has an opportunity to combine file systems on different devices into the unified file system described by a single directory tree. Such operation is called mounting, which has been defined in a paper called *Operating Systems: a design-oriented approach* by Charles Crowley Irwin, 1997, ISBN 0-256-15151-2, p 700-703.

Figure 1:
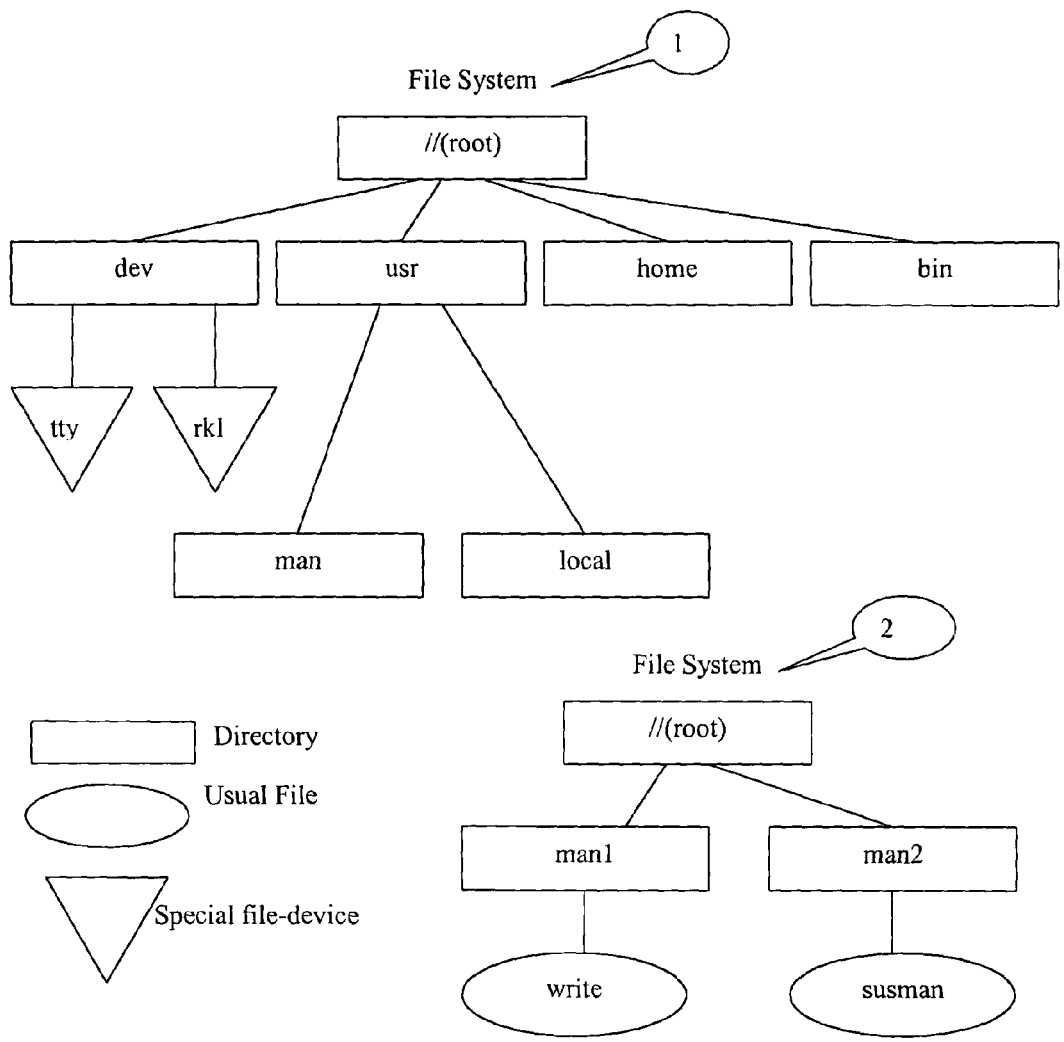
FIGS. 1 and 2 illustrate an exemplary mounting operation in accordance with an embodiment of the present invention.

FIG. 1 illustrates an example of how this mounting operation is performed by an embodiment of the present invention. Referring now to FIG. 1, a first file system 1 and a second file system 2 is used with an operating system (e.g., a network OS or a UNIX OS). Among all available logical disk devices the operating system selects one device called a system device. That is, the first file system 1 and the second file system 2 should be considered as two file systems on different logical disks where one disk is a system device (or disk).

Figure 2:
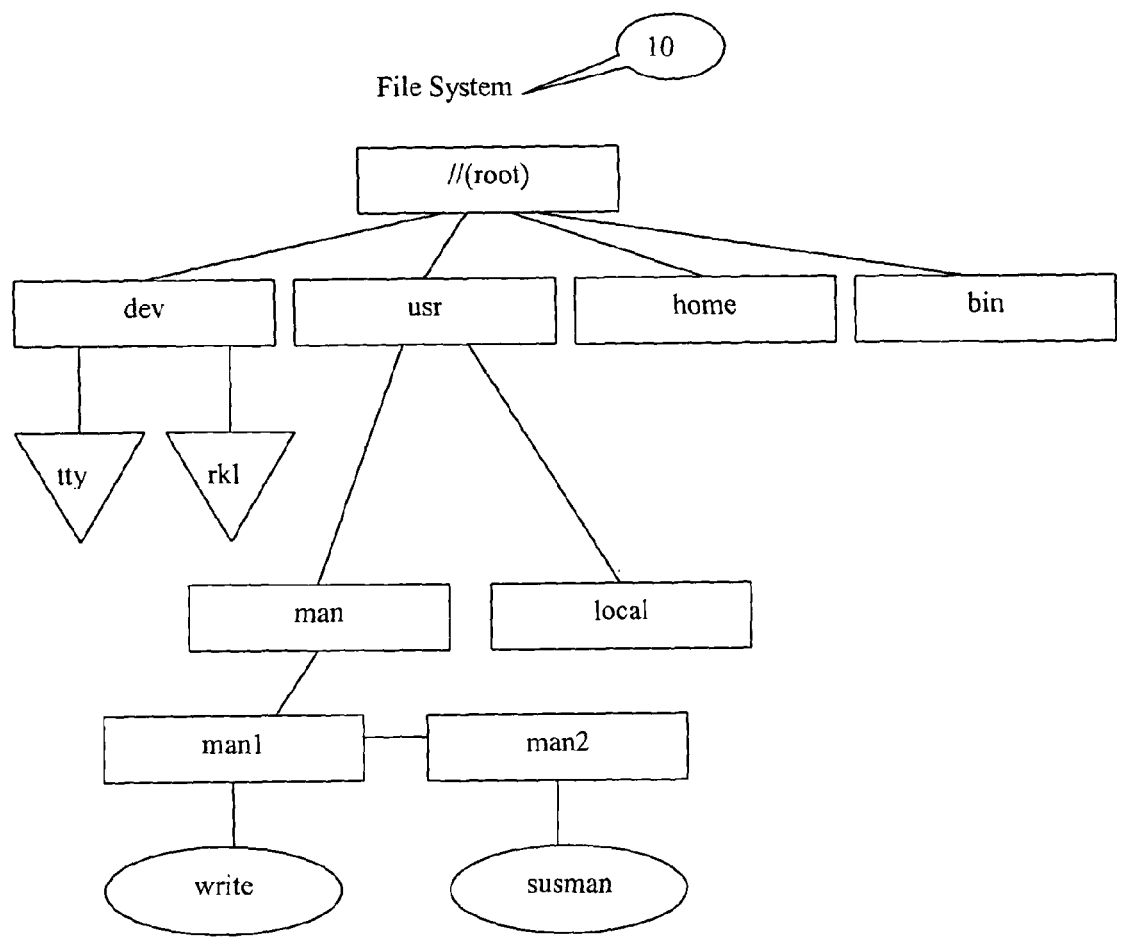

Referring now also to FIG. 2, the file system located on the system disk, for example the first file system 1, is assigned as a root system. To link a file hierarchy in the root system (e.g., file system 1) with another file hierarchy (e.g., file system 2) it is necessary to select an existing directory in the root system, in this exemplary embodiment, the directory is "man." After mounting the selected directory "man" becomes the root directory for the second file system 2. Via this directory the second file system 2 being mounted is attached as a sub-tree to the overall tree (i.e., file system 10).

Referring now only to FIG. 2, after mounting of the overall file system 10 for users, there is no logical difference between root and mounted file systems. That is, file naming is provided the same way as if it were unified from the very beginning.

Mounting can be further categorized as bind mounting and loopback mounting. In bind mounting, the mounting is provided as a mechanism that allows mounting of all or even a part of a file system already mounted to another location. After that the file system becomes available from both mounting points. For example, it is possible to use bind mounting to mount the existing root file system to directory /home/drobbins/nifty. After that directory /home/drobbins/nifty contains the file system root (/home/drobbins/nifty/etc, /home/drobbins/nifty/opt and so on). If a file in the file system root is modified, then the given modification will be reflected in /home/drobbins/nifty as well. This is because they are one and the same file system. (Note, however, that if afterwards the file system is mounted somewhere else, then any file systems that were mounted to mount points inside the bind-mounted file system will not be reflected. In other words, if /usr is located on another separate bind-mounted file system, then after bind mounting shown above, directory /home/drobbins/nifty/usr will be empty.) Therefore, bind mounting if used properly can be used to allow access to the same file via different paths. (Note, also, that bind mounting can also be referred to as null mounting.)

Loopback mounting is a mechanism that allows mounting of a Linux OS file system stored as an image in a file. For example, command 'mount root_fs.ext2 /mnt.ext2 -o loop,ro' performs mounting of a file system image 'root_fs.ext2' and provides access to it through directory /mnt.ext2. Such approach is often used to copy compact disks (CDs) when initially a disk image is created in a file and then this image is mapped and works as a usual disk.

User Accounts

Embodiments of the present invention can be implemented with a user and a user group that has a symbolic name as well as a unique numeric identifier. In some embodiments, when performing the procedures of user creation, a user provides her symbolic name and password, and an operating system detects the corresponding numeric identifiers of users and groups she is part of. All identification data, including names and identifiers of users and groups, user passwords, as well as information regarding users belonging to groups are stored in a special file (e.g., in file /etc/passwd in Unix) or in a special database (in Microsoft Windows NT).

The operating system separates users by assigning them unique identifiers. A domain of computers joined into a network can be considered as unique identifiers, e.g., Microsoft Windows Active Directory domain, or a computer system itself, e.g., a standalone computer controlled by a local operating system or any part of the computer system, for example, the change root (chroot) environment in an OS like UNIX or virtual environments (VE) provided by Virtuozzo technology. In one embodiment, the chroot environment can be used to create an impenetrable (theoretically) jail protecting what is being chrooted from being able to read or modify any files outside of the chroot environment. In addition, in the context of an embodiment of the present invention, any number within a certain range can be used as an identifier, e.g., UID of a UNIX-flavored OS user or a more complicated data structure, e.g., Security Identifier (SID) of Microsoft Windows NT.

In practically all operating systems the access rights matrix for an object can be stored "by parts." For example, in some OSes for each file or directory a so called Access Control List (ACL) is created, where rights are described to execute user or user groups operations over this file or directory. File owner ID is stored together with ACL. ACL is part of the file or directory characteristics and is stored on a disk in a certain area, for example, in the index descriptor 'inode' of the file system 'ufs'. Not all file systems support ACLs, for example, there are no ACLs in system FAT, because it was developed for the single-user single-program operating system MS-DOS.

In UNIX OS, each file has an associated user ID—UID which is unique in OS for each user. In Microsoft Windows NT, there is a common object model for each file, which contains such security characteristics as a set of allowed operations, owner identifier and ACL. An object owner, usually a user who created it, has a right of selective control of access to the object and can modify ACL of the object to permit or forbid others to access the object. An embedded Windows NT administrator (unlike a UNIX super-user) cannot have some automatic access permissions to the object. To have access permissions, the administrator and administrator group identifiers have to be part of ACL as well as identifiers of usual users. However, an administrator always has the opportunity to access any operations with any objects, because she can always become an object owner, and then as an owner get the required set of credentials.

An essential part of any modern file system, designed for multi-user access, is a sub-system of disk resource allocation or quota. To illustrate, a quota usage embodiment of the present invention can be implented with Microsoft Windows NT. Quota management can be implemented using two different approaches. The first approach is used to control file creation and disk space allocation after file operations are over and uses the NT security sub-system to forbid access. The second approach implies integration of a driver into the operating system, which controls file creation and disk space modification in real time before the input/output operation is over. To forbid access to an application an error "quota exceeded" is displayed.

Quota Imposition

One of the main problems with quota implements is that quotas must be directly specified in the whole set of nodes. Though quotas can be controlled from the central server, such solution is not optimal, because in this case the central server would become a bottleneck as each write operation would request permission for execution from the central server. A method and a system can be developed to issue shares of quota to computers that provide active writes to the file system on behalf of the user. Recovery of such resources in case of an error may also be provided.

For example, in a parallel file system, all disks composing it can be independently interrogated for file read or write. When a processor creates files, it requires a number of sectors allocated on the disk. Sectors allocated to a file would belong to a certain user and be limited by a quota which contains information on the disk space that can be used by a user or group of users. The problem here is that the user can work on several processors simultaneously and be limited by the same quota. Centralization of allocation of new disk blocks replaces a massive parallel file system.

An example of quota implementation for a parallel file system is a system and method that allocates shares of quota to each node, re-assigns them according to a set of requirements and recovers them in case of failure. The system and method includes a method for quota management for disk blocks and inode (i.e., data structures that contain information about files) that can be applied to a massive parallel computing system. The method is performed by a quota server per file system and a quota client for a node per file system, which actively processes data within the file system.

Quota limit is a threshold upon which the user can allocate inode or file system space. A quota can be a number of inodes and disk space a user can take. Local share is a space the quota client can allocate for the given user without connecting to the quota server.

The server supports the permanent file which contains quota limits and accumulates data about the usage of file space for all users of the parallel file system. The file is available only on the server, which provides access to the file and update of the file for all processors. That is, only the server has general information about quota usage and space allocation.

All actions related to general quota management are performed on the server. Limit modification, allocation of local shares and current status representation require coordination with the quota server. Quota clients perform modifications in distribution of file space according to the local share and periodically update data on the server depending on the share utilization. The server can annul the client's share and to allocate this share to another client.

Specifically, quota clients by default have a zero share. Only if an application on the processor starts creating new data on the file system, then the local share would be requested from the server. Only if the client gets the corresponding local share, will the application request be satisfied. Otherwise the request will not be satisfied. The quota client keeps a record of the local share and space taken by it. Applications that free disk space increase local shares for the user. The quota client periodically updates the quota server and provides it with information about local shares usage.

The quota server distributes local shares until it has available quotas; that is, while the system-wide quota limit is not exhausted. If all available quotas are given out for local shares, then the quota server will revoke them to provide new requests. The server will revoke a part of the local share, which allows the user to use the remaining part of the share. The server can also revoke most of the local shares until no quotas remain, which can lead to denial to the application's request.

The above references to quota imposition illustrates certain problems and solutions that may appear while implementing quota.

Management of Resource Allocation

In essence, embodiments of the present invention provide a method and system to manage the process of disk space or other quantitative parameter of resource allocation in computer data storages, particularly concerning areas of quotable space or time.

A exemplary method and system of the present invention comprises an establishment of quotas for an area of a file system that takes into account the belonging of a file to a certain subtree or subtrees of the file system.

Quota management is established within a usual computer system which includes the hierarchic file system as well as a set of unique users that could be united into groups.

The software of the computer system separates users by assigning unique identifiers to them. Such unique identifiers can be implemented through a domain of computers linked into a network, for example Microsoft Windows Active Directory domain, or the whole computer system, for example, a standalone computer with the local operating system, or any part of a computer system, for example, the chroot environment in a UNIX OS or Virtual Environments (VE) of Virtuozzo technology. An embodiment of the invention can use as an identifier any number within a certain range, for example, user UID of a UNIX OS, or a more complicated data structure, for example, Security Identifier (SID) of Microsoft Windows XP. Several users with their unique identifiers can make a group, which can also get its own unique identifiers among group identifiers; several groups can also make a group with its own identifier, and so on. One user or group can enter into several groups simultaneously; that is, membership in a group is not exceptional.

The file system of the computer system of the present invention can be implemented as a hierarchic tree, where each file has a so called "full access path" and also has user identifiers, and probably one or several groups declaring belonging of this file to this user and corresponding groups. Thus, a computer system program or the operating system kernel can access files of the file system by specifying the access path to the file, and there is always an opportunity to determine belonging (or ownership) of the file to any user and/or groups.

At the computer's boot-up, a specific procedure of the initial system rollout is executed in an embodiment of the present invention. This specific procedure creates an initial root file system that usually contains special files of the operating system intended to serve procedures of the initial system configuration and startup. Later on the expansion of the file system available for operating system processes is provided by mounting of the additional space.

Figure 3:
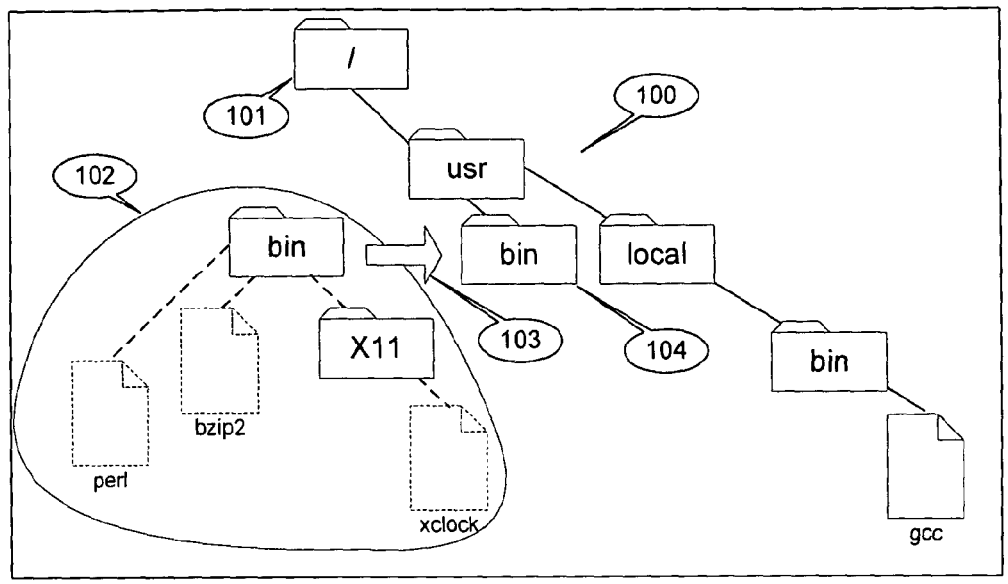
FIG. 3 illustrates an exemplary computer file system before mounting of the sub-tree in accordance with an embodiment of the present invention.

In general, according to the forgoing, FIG. 3 illustrates a process of file system mounting in accordance with an embodiment of the present invention. Referring to FIG. 3, the hierarchic file system 100 of the mounting process starts from some area 101 specified as a root of the file system (though in some embodiments of the present invention, for example, an embodiment used in a Microsoft Windows operation system, this area may be hidden from users' direct access). In the present embodiment, the purpose of the mounting process 103 is to attach the data storage 102 to the file system directory 104 to let the processes of the computer's operating system access information located at area 102 of the file system the same way as the processes do to the files located at area 100. The storage 102 can be a part of the physical disk, for example, a specifically created and formatted partition, or network storage with the corresponding interface providing access, or area inside of the existing file system 100 access to which after such a procedure can be done by an alternative path.

Figure 4:
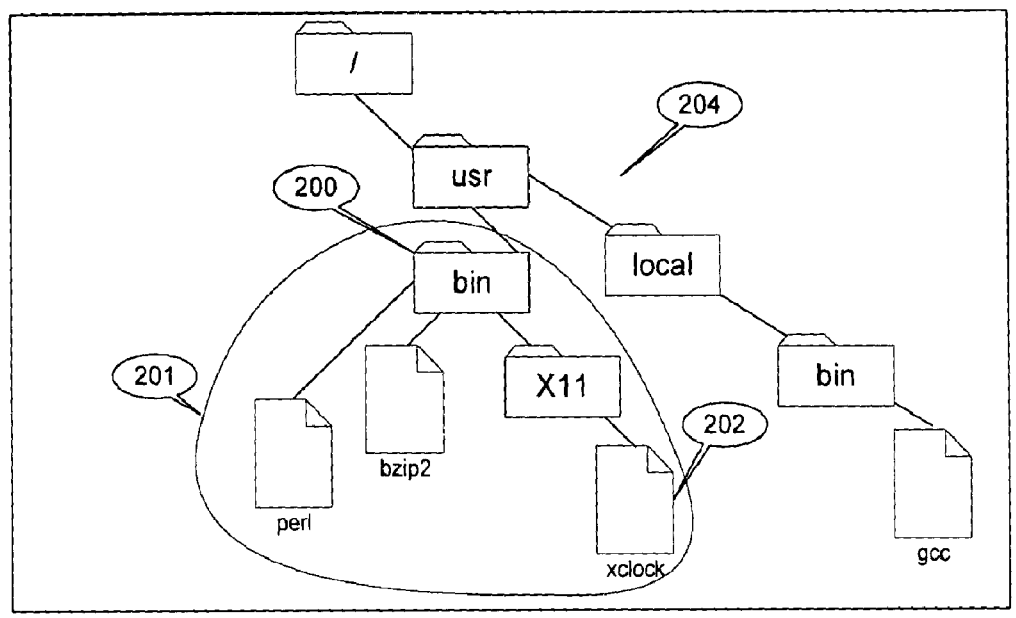
FIG. 4 illustrates a exemplary computer file system after mounting of the sub-tree in accordance with an embodiment of the present invention.

Referring now to FIG. 4, after an area of the file system has been mounted by an embodiment of the present invention, the processes of the operating system and its kernel acquire an opportunity to get access inside of the file system 204 to the newly mounted subtree 201 of the file system via the mounting point 200. For example, if area 201 is mounted with the access path /usr/bin, then its internal file 202 will be accessible by the path /usr/bin/X11/xclock.

In one embodiment of the present invention, the area of computation of the space used by the file system can be defined as one or several subtrees of the computer file system where each of the subtrees can include only one mounting area. For example, referring now to FIG. 5, the file system of computer 300 comprises a base part of system 305 and mounted sub-area 302 with the access path 301 /usr/bin, and the quota area 304 lies on the search path below directory /usr and includes all files of the base area composing 304, but does not include files lying in the mounting area 302; that is, for example, the file /usr/local/bin/gcc belongs into the area of quoting, but files from subdirectory /var or /usr/bin/X11/xclock will not.

Figure 5:
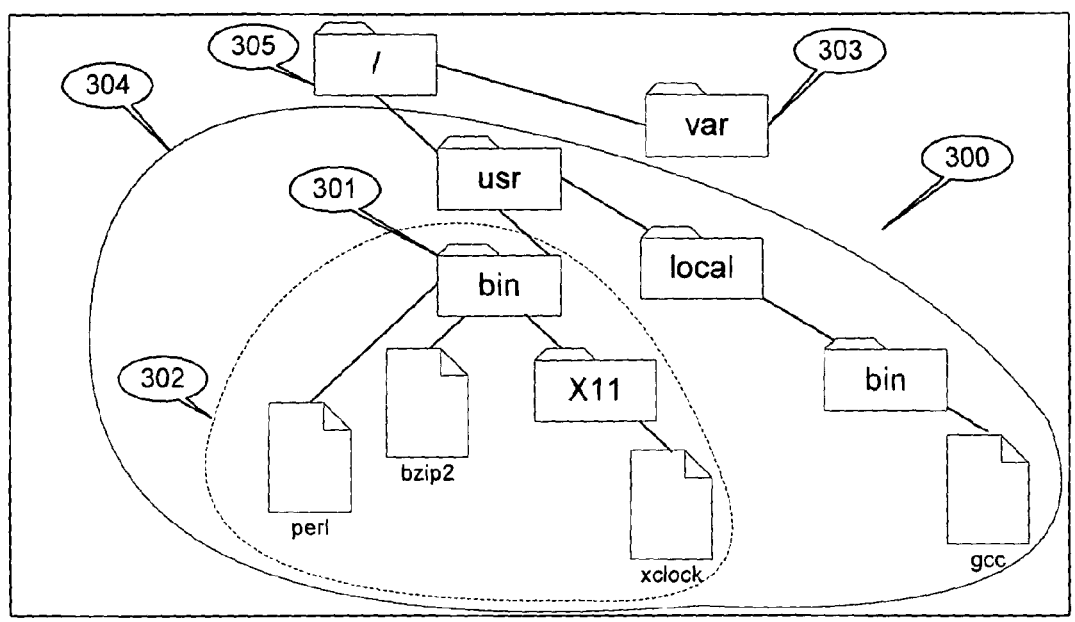
FIG. 5 illustrates an exemplary area of calculation of space or other quantitative parameter of resource consumption used by a file system in accordance with an embodiment of the present invention.

In the context of the embodiment shown in FIG. 5, belonging to the quota area is defined by the full access path to the file and this is done during opening of the file. If the full access path contains the path's part belonging to the area of quoting, starting from the directory root, then the file is considered belonging to the area of quoting. Thus, for example, the file /usr/local/bin/gcc (or the single file node) on FIG. 5 belongs to the quota area 304 because its full path contains the part "/usr/" which describes the area of quoting. Technically, in an alternative embodiment, the definition of belonging can be by direct comparison of access paths as well as by other means, for example, by recursive setting of an attribute of belonging of all files of the given subdirectory of the given quota area if the directory itself has such attribute.

For each quota area a set of quota parameters is defined. For example, in an embodiment of the present invention used in UNIX OS, a standard set of quota parameters is the size of occupied disk space and number of inodes (e.g., the number of files that can be created by a user in the area of quoting). Other values depending on the type of a data storage and file system can be used as quota parameters.

Belonging of the file to a certain user is defined in an embodiment of the present invention at the moment when it is accessed and it is based on the unique user identifiers stored in the file system. A quota management program can be used to associate each unique identifier to its own record that stores current values of quota parameters for this quota area for the corresponding identifier. The record can be stored in a plurality of ways, for example, the record can be stored in a separate file, unique for the given area as well as in the database or inside service data of the file system.

The uniqueness of the identifier can be provided within any given context. The entire operating system can be used in such context and this means that all identifiers must be unique inside it. Also, a dedicated area of the operating system, such as chroot or virtual environment can be used as a context. In such situations the same identifiers can be associated with the files that belong to different areas, but the quota management system will consider them separately, taking into account only those that are inside one area. Thus, an opportunity exists to support different users with the same identifiers, which takes off limitations on performance for the selected identifiers inside of one environment.

In one embodiment, a quota management system can be both part of the operating system kernel or a special process. The quota management system can also be a process that runs in the background of the operating system and performs a specified operation at predefined times or in response to certain events or it can be a program that controls a device. The quota management system is responsible for receiving requests on a change of a data size or a quantitative parameter of resource. The analysis of the requests depend on the current state of quota parameters as well as any modification of stored parameter values. The management system can (and in an embodiment must) be part of the file system functioning support system controlling the process of space allocation of the data storage.

In an embodiment, to allocate a new quantitative parameter of resource consumption or change the quantitative parameter of resource consumption already taken (e.g., new space or change the size of the space already taken), the following sequence of actions is used:

Definition of belonging of the mentioned space or quantitative parameter of resource consumption to some file of the file system, for example, if there is a request to increase the size or quantitative parameter of resource of the existing and open file, it is necessary to determine its name and other parameters pointing to it.

Definition of belonging to the area of computation of used quantitative parameter of resource consumption (e.g., used space) as described above.

Definition of an identifier or identifiers by which quoting is performed. If a file is already created and stored in the storage, then the identifier is defined by a identifier of a group and/or user and stored with the file. If a file does not exist, then belonging is defined by identifiers associated with the process, which had initiated creation of this file.

Search by the defined identifiers of quota parameters that can be stored in a special file, database, network server or identifiers.

Comparison of found limitations with the current value of used data storage space, current state of the computer system, current state of the file system and requested sizes of space allocation and other parameters of the data storage, which can affect the decision to accept or reject an operation. For example, if all the space allowed to a given user is already taken, then an attempt to request a new area of space in the storage will fail.

Figure 6:
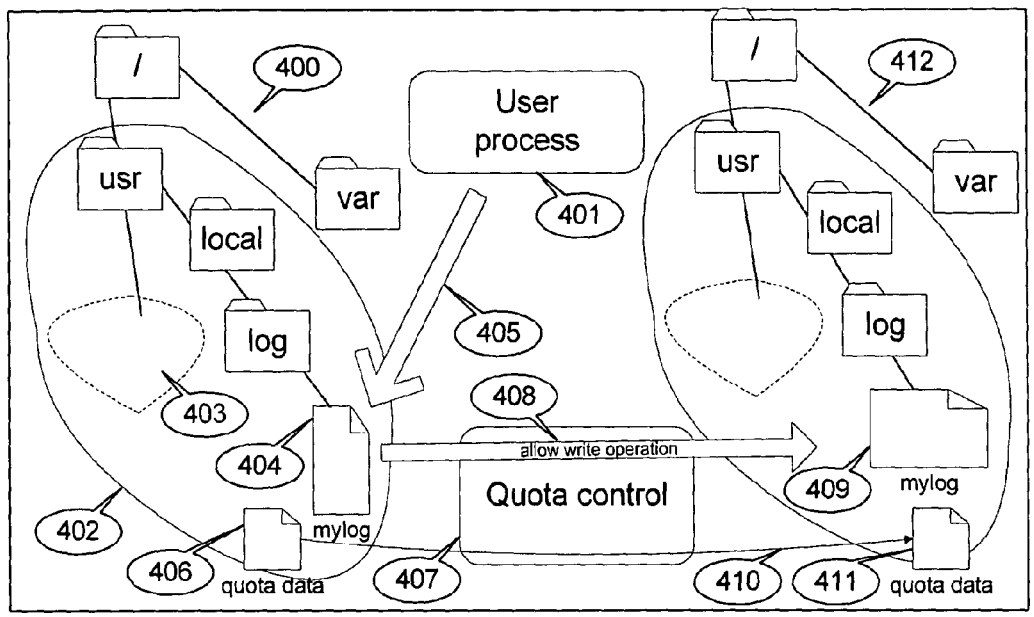
FIG. 6 illustrates an exemplary process of an alteration of space size or quantitative parameter of resource or other quantitative parameter of resource consumption occupied by a file taking into account a quota on the reserved resources in accordance with an embodiment of the present invention.

FIG. 6 illustrates a process of alteration of space size or some other quantitative parameter of resource consumption occupied by a file by taking into account quotas on the reserved resources in accordance with a more specific exemplary embodiment of the present invention. Referring now to FIG. 6 and assuming that the file system 400 contains a quota area 402. A process of a user or operating system 401 tries to change the length 405 of the file /usr/local/log/mylog 404 inside of the quota area 402 with the resource accounting file 406. The quota control system 407, which can be implemented as part of the operating system driver, responsible for the file system, or as an autonomous daemon of the operating system, receives this request, defines belonging of the file 404, and gets one or several unique identifiers by which it finds records corresponding to the given identifiers in the quota data file 406. Then the quota control system 407 checks whether this operation is permitted; that is, whether indices of space or other quantitative parameter of resource usage stay within permitted limits after the operation is over, and if the check is positive, allows the procedure of space size or quantitative parameter of resource alteration 408 to be executed. After the operation has been completed, the file 409 will become modified as well as the record about current values in the quota data file 411. Then, depending on the method of the quota control system 407 implementation, it is possible that because of bufferization the record about changes appears in the quota data file 411 later than the record in the file 409 itself. Quota data file 411 can be not only inside of, but also separate from the data storage and be a database or a special server with network access.

In one embodiment of the present invention, before usage of the quota data file, the quota data file needs to be initialized and filled out with initial values of parameters of data storage space or other quantitative parameters of resource consumption usage for unique identifiers and groups inside of the area of used quantitative parameters of resource consumption calculation. This can be defined by a computer system administrator or any other systems of automatic quota control.

Quota parameters in one embodiment of the present invention can depend on the used file system and can be as follows:

1. number of blocks occupied by data of one user partially or entirely for the file system, implemented above the block storage;

2. number of structures available to the user for the file system using special data structures associated to a file, for example, number of inodes in UNIX systems;

3. number or other parameters of service operations performed by the operating system to serve any user or group of users for a period of time, for example, a number of backup operations, or the size or quantitative parameter of resource of backup copies, or a number of disk operations done per a period of time; and/or 4. time and range of changes of other consumption parameters, allowed for usage by users that modify limits already set up, for example, a user may be allowed to temporarily violate the quota for occupied resources, but for a strictly limited time and within some specific limit.

It accordance with the forgoing, it should be apparent to those skilled in the art that the quota control system of the present invention does not require modification of the way files are stored in the file storage, including file metadata and the method of representation of service data of the file system; that is, the control system can work with the file system of any type.

It should also be apparent that an implementation of data storage quota of the present invention can work directly on the level of files and can use an archive bit as an attribute of a file when file archiving of the file is required. Moreover, an implementation of the present invention can quote data on the level of the tree of one file system and also quote the other levels of the tree (that is, inside of one mounting point of the tree and/or inside a whole sub-tree). In the context of this implementation, the other levels of the tree can be defined by the data storage volume within the local computer file system. Furthermore, a single partition of a file system (e.g., a mount point) can have a plurality of quotable areas with separate (i.e., their own) set of quota limitations.

Having thus described preferred embodiments of the present invention, it should be apparent to those skilled in the art that certain advantages of the within system have been achieved. It should also be appreciated that various modifications, adaptations, and alternative embodiments thereof may be made within the scope and spirit of the present invention. For example, an implementation of data storage quota in a network operating system (e.g., UNIX OS) has been illustrated, but it should be apparent that the inventive concepts described above would be equally applicable to other operating systems and quota systems. In addition, the computer systems described above are for purposes of example only. An embodiment of the invention may be implemented in any type of computer system. The invention is further defined by the following claims.

What is claimed is:

1. A system for implementing a data storage quota comprising:
    a processor;
    memory; and
    computer code stored in the memory for implementing the following:
    a file system having a plurality of users associated with it, each user having a unique user identifier;
    the file system comprising a plurality of files and a plurality of directories that are arranged into a plurality of trees, wherein each file and each directory has at least one unique file identifier;
    a level of consumption associated with a plurality of resources of the file system;
    a subtree that is subject to a quota and is inside an available directory of the file system such that a computer system uses the subtree as a tree of the file system;
    wherein the system calculates the resource consumption associated with the subtree by:
        defining a quota for a level of consumption of a plurality of resources of the file system related to the subtree;
        dynamically, and at a time of opening a file, analyzing a full access path to the file to determine whether the file belongs to the subtree and should be associated with the quota, based on the full access path that includes the subtree;
        associating a file request for data allocation to the file as being related to the subtree quota;
        for the subtree, storing the current level of consumption and the quota for the level of consumption of a plurality of resources of the file system associated with the unique user identifiers;
    in response to requests for data allocation, providing an allowed level of consumption associated with a quota for the level of consumption of a plurality of resources of the file system, based on the current level and the quota for the level of consumption of a plurality of resources of the file system; and
    based on the responses, reserving space for user data based on the unique user identifier,
    wherein the file system further comprises a data storage space mounted to an available directory area, the data storage space comprising a second file system, and wherein the second file system is attached as a subtree to the tree of the file system,
    wherein, after mounting of the file system, file naming represents a unified system for multiple subtrees with different mounting points,
    wherein the mounting makes the file system available from multiple mounting points and permits file access to the same file via different paths,
    wherein, whether the file belongs to the subtree is determined by a recursive check of belonging of a subdirectory of the subtree where the file is stored, to the quota,
    wherein the system includes a component implemented as part of an operating system driver,
    wherein at least some files belong to multiple subtrees, and wherein a mount point of a subtree has a plurality of quotable areas each with a separate quota limitation.

2. The system of claim 1, wherein the file system has a hidden root directory that is not visible to the users.

3. The system of claim 1, wherein each user identifier denotes belonging to at least one of the plurality of users and at least one user group.

4. The system of claim 1, wherein the computer system uses the second file system as an extension of the file system.

5. The system of claim 1, wherein the directories act as mounting points of the file system that are located inside the file system and are utilized by a plurality of mounting objects.

6. The system of claim 5, wherein the plurality of mounting objects comprise a plurality of file system volumes and a plurality of file system subtrees.

7. The system of claim 1, wherein file identifiers are unique within a context of an operating system of the computer system.

8. The system of claim 7, further comprising a computer network connected with the computer system and wherein the context of the operating system comprises a set of file identifiers unique in the computer network.

9. The system of claim 7, wherein the context of the operating system comprises a set of file identifiers unique to an allocated area of the computer system.

10. The system of claim 9, wherein the allocated area comprises a chroot environment.

11. The system of claim 9, wherein the allocated area comprises a virtual environment.

12. The system of claim 1, wherein parameters of the file system comprise any of:
   a consumption parameter on a size of a data storage device associated with at least one of the plurality of users and that user's group,
   a consumption parameter on a number of various auxiliary file system structures used to arrange files of the at least one user,
   a consumption parameter on other parameters of auxiliary operations performed by an operating system to service the at least one user, and
   a consumption parameter on a time and range of modifications of any of the above consumption parameters that allow a user to modify previously defined limitations.

13. The system of claim 1, wherein using the quota does not require modifying how data and file metadata are represented in the file system, and does not require modifying how file system service data is represented at a hierarchic level below the file system.

14. The system of claim 1, wherein the system:
   releases an allocated area size and a plurality of other data storage parameters; and
   modifies the allocated area size and the plurality of other data storage parameters.

15. The system of claim 14, wherein the releasing and modifying comprise:
   for an operation to be performed on a file, identifying the file and which quotas are associated with that file and that operation,
   wherein the quotas include resource consumption parameters;
   determining unique file identifiers associated with the quotas;
   determining current resource consumption parameters for the file;
   for each current resource consumption parameter, identifying a plurality of limitations associated with the current resource consumption parameters based on the quotas associated with at least one user;
   comparing the identified limitations with a current value of available resources, wherein the resources include any of a storage usage, a current state of the computer system, a current state of the file system and a requested size for an allocated space and other parameters of data storage;
   determining whether the operation can be performed, based on the comparing step; and
   executing the operation updating the current resource consumption parameter, wherein the current resource consumption parameter is stored in any of a special file, a data storage area, a computer operating memory, and a server.

16. The system of claim 15, wherein the system releases storage space, based on the resource consumption parameters, for user data identified by the user identifiers.

17. The system of claim 15, wherein the system reserves storage space, based on the resource consumption parameters, for user data identified by the user identifiers.

18. The system of claim 15, wherein the system modifies an amount of allocated storage space, based on the resource consumption parameters, for user data identified by the user identifiers.

19. The system of claim 1, wherein the system sets up values of usage limits for the level of consumption for the user identifiers.

20. The system of claim 1, wherein the system tracks changes of a resource consumption level due to processing of the requests by the operating system.

21. A method for implementing a data storage quota, the method comprising:
   on a computer, instantiating a file system having a plurality of users associated with it, each user having a unique user identifier, the file system comprising a plurality of files and a plurality of directories that are arranged into a plurality of trees, wherein each file and each directory has at least one unique file identifier;
   associating a level of consumption with a plurality of resources of the file system, the file system having a subtree that is subject to a quota and is inside an available directory of the file system such that a computer uses the subtree as a tree of the file system;
   calculating the resource consumption associated with the subtree by:
      defining a quota for a level of consumption of a plurality of resources of the file system related to the subtree;
      dynamically, and at a time of opening a file, analyzing a full access path to the file to determine whether the file belongs to the subtree and should be associated with the quota, based on the full access path that includes the subtree;
      associating a file request for data allocation to the file as being related to the subtree quota;
      for the subtree, storing the current level of consumption and the quota for the level of consumption of a plurality of resources of the file system associated with the unique user identifiers;
   in response to requests for data allocation, providing an allowed level of consumption associated with a quota for the level of consumption of a plurality of resources of the file system, based on the current level and the quota for the level of consumption of a plurality of resources of the file system; and
   based on the responses, reserving space for user data based on the unique user identifier,
   wherein the file system further comprises a data storage space mounted to an available directory area, the data storage space comprising a second file system, and wherein the second file system is attached as a subtree to the tree of the file system, wherein, after mounting of the file system, file naming represents a unified system for multiple subtrees with different mounting points, wherein the mounting makes the file system available from multiple mounting points and permits file access to the same file via different paths, wherein, whether the file belongs to the subtree is determined by a recursive check of belonging of a subdirectory of the subtree where the file is stored, to the quota, wherein the system includes a component implemented as part of an operating system driver, wherein at least some files belong to multiple subtrees, and wherein a mount point of a subtree has a plurality of quotable areas each with a separate quota limitation.

22. A computer program product comprising a non-transitory storage medium containing computer executable code for implementing the steps of claim 21.

* * * * *